United States Patent
Yoshizawa et al.

(10) Patent No.: US 11,019,247 B2
(45) Date of Patent: May 25, 2021

(54) IMAGING SYSTEM

(71) Applicant: FUJIFILM CORPORATION, Tokyo (JP)

(72) Inventors: Hirotoshi Yoshizawa, Kanagawa (JP); Yoshihisa Usami, Kanagawa (JP); Shinichiro Sonoda, Kanagawa (JP); Hajime Terayoko, Kanagawa (JP); Erina Ogura, Kanagawa (JP); Nobuya Tanaka, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 17/080,848

(22) Filed: Oct. 27, 2020

(65) Prior Publication Data

US 2021/0058542 A1 Feb. 25, 2021

Related U.S. Application Data

(63) Continuation of application No. PCT/JP2019/016320, filed on Apr. 16, 2019.

(30) Foreign Application Priority Data

May 11, 2018 (JP) .............................. JP2018-092465

(51) Int. Cl.
*H04N 5/232* (2006.01)
*H04N 1/00* (2006.01)

(52) U.S. Cl.
CPC ..... *H04N 5/23203* (2013.01); *H04N 1/00196* (2013.01); *H04N 5/23219* (2013.01); *H04N 5/23299* (2018.08)

(58) Field of Classification Search
CPC .... H04N 1/00196; H04N 5/222; H04N 5/232; H04N 5/23203; H04N 5/23219;

(Continued)

(56) References Cited

U.S. PATENT DOCUMENTS

2003/0156199 A1* 8/2003 Shindo ............... H04N 5/23219
348/207.99
2003/0189730 A1* 10/2003 Enomoto ............... H04N 1/387
358/3.26

(Continued)

FOREIGN PATENT DOCUMENTS

JP 2005-65022 A 3/2005
JP 2005-65024 A 3/2005

(Continued)

OTHER PUBLICATIONS

International Search Report issued in International Application No. PCT/JP2019/016320 dated Jul. 23, 2019.

(Continued)

*Primary Examiner* — Chiawei Chen
(74) *Attorney, Agent, or Firm* — Solaris Intellectual Property Group, PLLC

(57) ABSTRACT

An imaging system that includes a plurality of mobile type apparatus. Each of the plurality of mobile type apparatuses performs, in a case where a preset imaging target and a mobile type apparatus to which a role of an imaging target is assigned are present in an acquired image, a control for forming an image on a recording medium, discharges the recording medium on which the image is formed, to a preset delivery target in a deliverable state, and controls movement of the mobile type apparatus for delivering the recording medium to a delivery target. The plurality of mobile type apparatuses include at least one mobile type apparatus to which the role of the imaging target is assigned, and at least one mobile type apparatus to which a role of a imaging responsibility is assigned.

21 Claims, 11 Drawing Sheets

(58) Field of Classification Search
CPC ...... H04N 5/23299; H04N 5/247; H04N 7/18; G05D 1/02; G03B 15/00
See application file for complete search history.

(56) References Cited

U.S. PATENT DOCUMENTS

| | | | |
|---|---|---|---|
| 2004/0236733 A1* | 11/2004 | Hung | G06F 16/5838 |
| 2004/0253009 A1* | 12/2004 | Kitamura | G03G 15/234 |
| | | | 399/13 |
| 2005/0041839 A1* | 2/2005 | Saitou | H04N 1/00164 |
| | | | 382/103 |
| 2010/0013977 A1* | 1/2010 | Suzuki | H04N 5/23218 |
| | | | 348/333.11 |
| 2018/0089511 A1 | 3/2018 | Tsuchimochi | |

FOREIGN PATENT DOCUMENTS

| | | |
|---|---|---|
| JP | 2016-177726 A | 10/2016 |
| JP | 2017-54537 A | 3/2017 |

OTHER PUBLICATIONS

Written Opinion of the ISA issued in International Application No. PCT/JP2019/016320 dated Jul. 23, 2019.
International Preliminary Report on Patentability issued in International Application No. PCT/JP2019/016320 dated Dec. 24, 2019.

* cited by examiner

FIG. 1
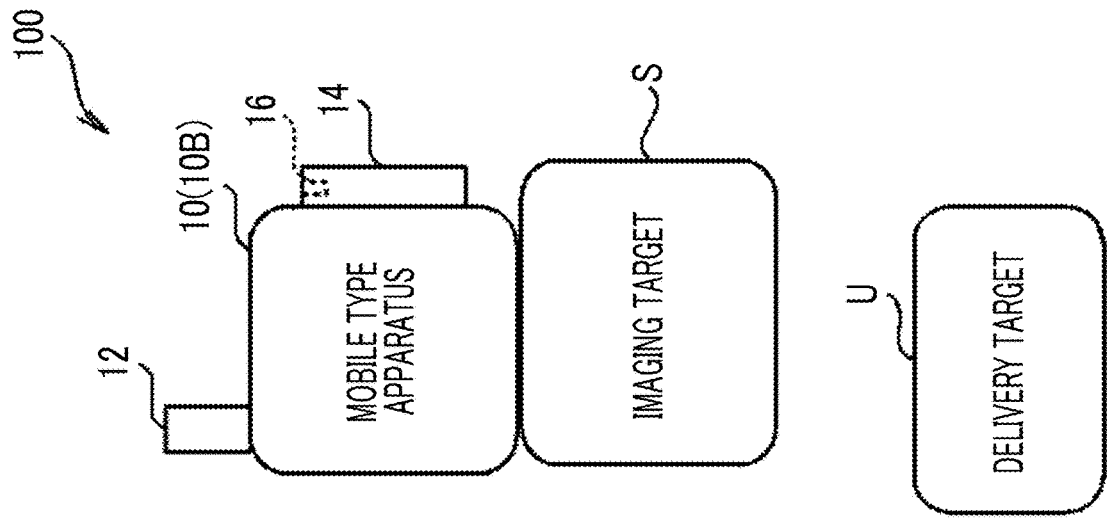
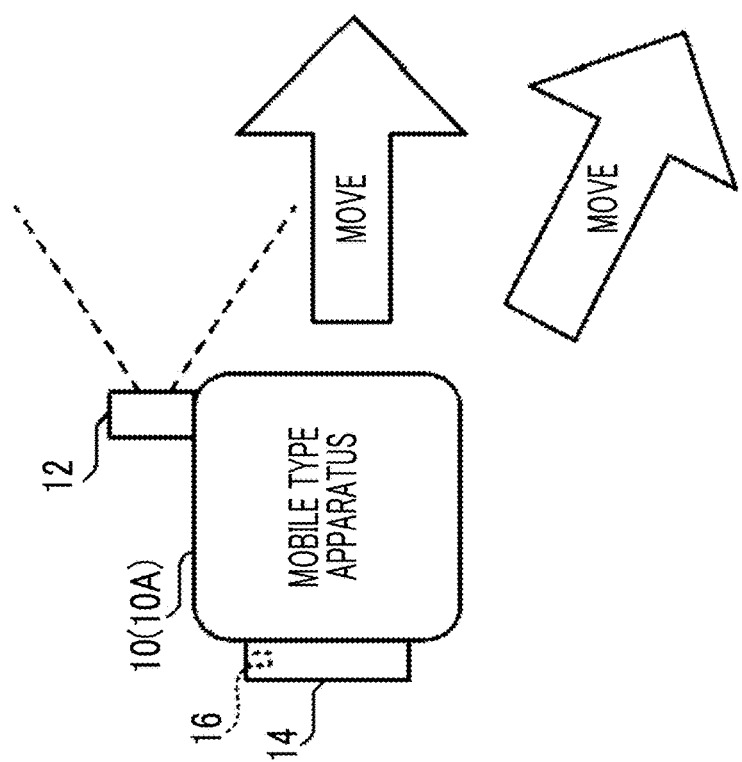

IMAGING SYSTEM

CROSS-REFERENCE TO RELATED APPLICATIONS

This application is a continuation of International Application No. PCT/JP2019/016320, filed on Apr. 16, 2019, which claims priority to Japanese Patent Application No. 2018-092465, filed on May 11, 2018. The entire disclosures of both of the above applications are hereby incorporated by reference into the present application.

BACKGROUND

Technical Field

The present disclosure relates to an imaging system.

Related Art

An image forming apparatus that is self-propelled to a vicinity of a user in a case where an instruction to start forming an image is input from the user has been suggested (refer to JP2017-054537A). This image forming apparatus is self-propelled to the vicinity of the user and then, starts forming the image in a case where a predetermined operation is performed by the user.

A mobile type apparatus that comprises an imaging apparatus and images a moving imaging target by following the imaging target has been suggested (refer to JP2005-065022A).

For example, in a case where the user desires to image a photograph together with at least one of a plurality of mobile type apparatuses such as pet type robots, an effort of the user can be reduced in a case where at least one mobile type apparatus other than the mobile type apparatus desired to be imaged together performs imaging. Thus, such a case is preferable. However, in the technologies disclosed in JP2017-054537A and JP2005-065022A, the effort of the user performing imaging with at least one of the plurality of mobile type apparatuses is not considered.

SUMMARY

An aspect of the present disclosure is an imaging system that includes: a plurality of mobile type apparatuses each including: a first memory; and a first processor being connected to the first memory and being configured to: recognize whether a role of an imaging target is assigned or a role of imaging responsibility is assigned to a host apparatus, in a case where assignment of the role of the imaging responsibility is recognized, acquire an image obtained by imaging performed by an imaging apparatus, in a case where at least one of a preset imaging target or a mobile type apparatus to which the role of the imaging target is assigned is not present in the acquired image, perform a control for arranging, within an angle of view of the imaging apparatus, the preset imaging target and the mobile type apparatus to which the role of the imaging target is assigned, in a case where the preset imaging target and the mobile type apparatus to which the role of the imaging target is assigned are present in the acquired image, perform a control for storing the acquired image in a storage unit, in a case where the preset imaging target and the mobile type apparatus to which the role of the imaging target is assigned are present in the acquired image, perform a control for forming the image on a recording medium, discharge the recording medium on which the image is formed, to a preset delivery target in a deliverable state, and control movement of the mobile type apparatus for delivering the recording medium to the delivery target, wherein the plurality of mobile type apparatuses include at least one mobile type apparatus to which the role of the imaging target is assigned, and at least one mobile type apparatus to which the role of the imaging responsibility is assigned.

BRIEF DESCRIPTION OF THE DRAWINGS

FIG. 1 is a block diagram illustrating one example of a configuration of an imaging system according to a first embodiment.

DETAILED DESCRIPTION

Figure 2:
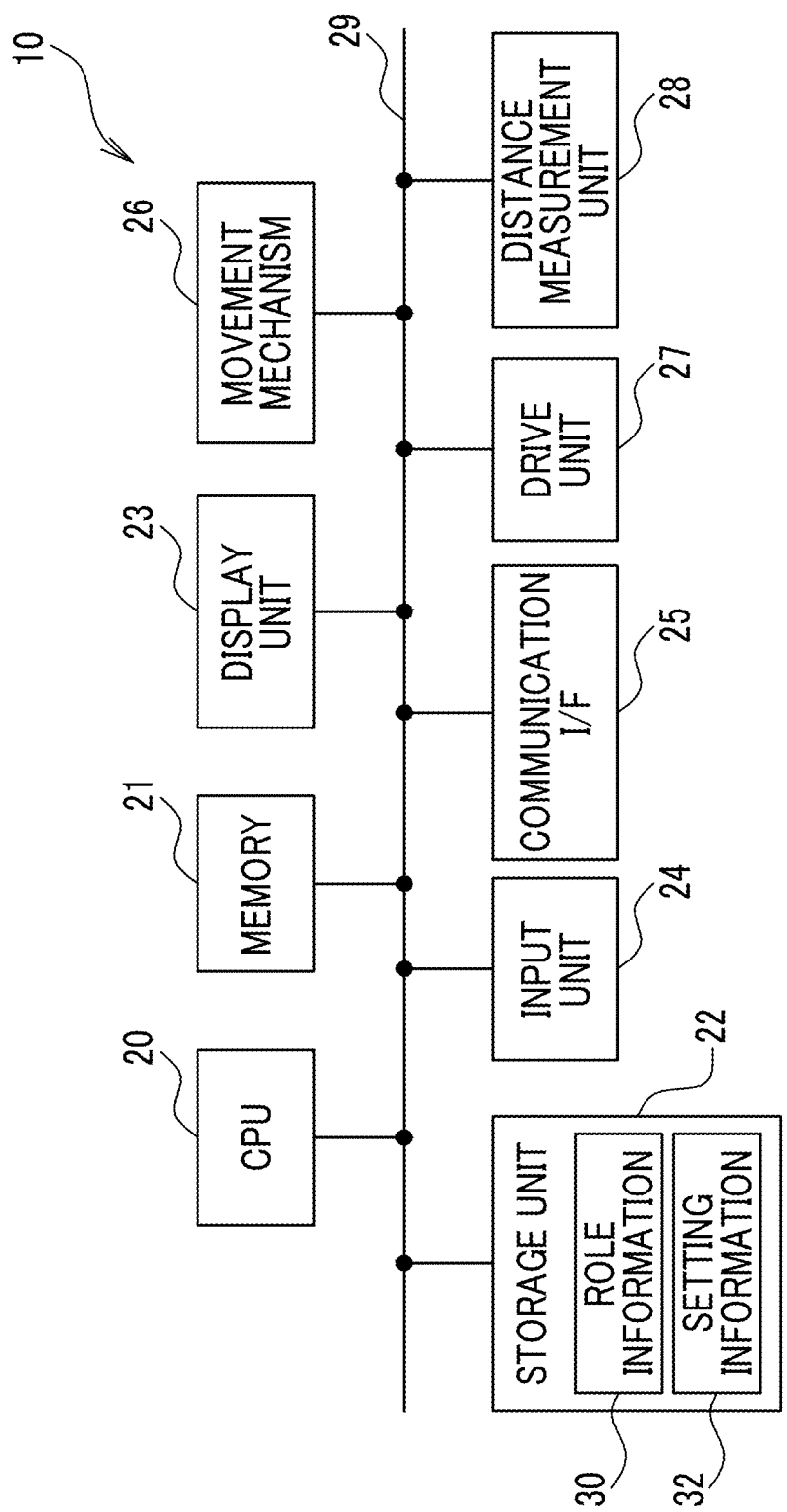
FIG. 2 is a block diagram illustrating one example of a hardware configuration of a mobile type apparatus according to each embodiment.

Hereinafter, embodiments of the technology of the present disclosure will be described in detail with reference to the drawings.

First Embodiment

First, a configuration of an imaging system 100 according to the present embodiment will be described with reference to FIG. 1. As illustrated in FIG. 1, the imaging system 100 includes a plurality (in the present embodiment, two) of mobile type apparatuses 10. In the present embodiment, a role of imaging responsibility is assigned to one of two mobile type apparatuses 10, and a role of an imaging target is assigned to the other. Examples of two mobile type apparatuses 10 include a pair of pet type robots. The number of mobile type apparatuses 10 is not limited to two and may be greater than or equal to three. In this case, three or more mobile type apparatuses 10 includes at least one mobile type apparatus 10 to which the role of the imaging target is assigned, and at least one mobile type apparatus 10 to which the role of the imaging responsibility is assigned. Hereinafter, two mobile type apparatuses 10 will be referred to as the "mobile type apparatus 10" unless a distinction therebetween is made. In addition, hereinafter, for facilitating description, in a case of distinguishing between two mobile type apparatuses 10, the mobile type apparatus 10 to which the role of the imaging responsibility is assigned will be referred to as a "mobile type apparatus 10A", and the mobile type apparatus 10 to which the role of the imaging target is assigned will be referred to as a "mobile type apparatus 10B".

The mobile type apparatus 10 comprises an imaging apparatus 12 and an image forming apparatus 14. The mobile type apparatus 10 and the imaging apparatus 12 are communicably connected by at least one of wired communication or wireless communication. The mobile type apparatus 10 and the image forming apparatus 14 are communicably connected by at least one of wired communication or wireless communication. Only the mobile type apparatus 10A out of the mobile type apparatus 10A and the mobile type apparatus 10B may comprise the imaging apparatus 12 and the image forming apparatus 14.

The imaging apparatus 12 includes an imaging element such as a charge coupled device (CCD) image sensor or a complementary metal oxide semiconductor (CMOS) image sensor, and an imaging lens, and outputs an image obtained by imaging to the mobile type apparatus 10. The imaging apparatus 12 is mounted on a movement mechanism 26 (refer to FIG. 2). A height and an attitude of the imaging apparatus 12 can be controlled by controlling the movement mechanism 26 using the mobile type apparatus 10.

The image forming apparatus 14 comprises a plurality of light emitting elements and forms an image on a photosensitive recording medium such as a photosensitive film by causing the light emitting elements to emit light. The image forming apparatus 14 may be an apparatus that forms the image on the recording medium using other methods such as an ink jet method, a xerographic method, a thermal method, and a thermal transfer method. The image forming apparatus 14 comprises a discharge unit 16 that discharges the photosensitive recording medium on which the image is formed, to a preset delivery target U in a deliverable state. For example, the deliverable state is a state where the discharge unit 16 discharges one end side of the photosensitive recording medium to an outside of the image forming apparatus 14 and holds the other end side thereof.

The mobile type apparatus 10 comprises a plurality of wheels and can move in all directions in 360 degrees by controlling rotation and directions of the wheels. The mobile type apparatus 10 may be a moving object that moves by bipedal walking, quadrupedal walking, or the like, may be a flying object that moves in a floating state by a magnetic force, or may be a flying object that moves by flying using a propeller or the like.

The mobile type apparatus 10A according to the present embodiment images a preset imaging target S and the mobile type apparatus 10B using the imaging apparatus 12 and forms an image obtained by imaging on the photosensitive recording medium using the image forming apparatus 14. The mobile type apparatus 10 according to the present embodiment moves in order to deliver the photosensitive recording medium on which the image is formed, to the delivery target U.

Examples of the imaging target S include a target represented by a common noun such as a child, a person, a baby, an animal, a dog, and a building, and a target represented by a proper noun such as a specific person, a specific pet, and a specific building. Examples of the delivery target U include a target represented by a proper noun such as a specific person. The imaging target S and the delivery target U may be the same person.

Next, a hardware configuration of the mobile type apparatus 10 will be described with reference to FIG. 2. As illustrated in FIG. 2, the mobile type apparatus 10 comprises a central processing unit (CPU) 20, a memory 21 as a temporary storage region, and a non-volatile storage unit 22. In addition, the mobile type apparatus 10 comprises a display unit 23 such as a liquid crystal display and an input unit 24 such as a touch panel integrated with various buttons and the display unit 23. In addition, the mobile type apparatus 10 comprises a communication interface (I/F) 25 that is used for communication among the imaging apparatus 12, the image forming apparatus 14, and an external apparatus, the movement mechanism 26, a drive unit 27, and a distance measurement unit 28. The CPU 20, the memory 21, the storage unit 22, the display unit 23, the input unit 24, the communication OF 25, the movement mechanism 26, the drive unit 27, and the distance measurement unit 28 are connected through a bus 29.

The storage unit 22 is implemented by a hard disk drive (HDD), a solid state drive (SSD), a flash memory, and the like. The storage unit 22 stores role information 30 and setting information 32. Details of the role information 30 and the setting information 32 will be described later.

The movement mechanism 26 changes the height and the attitude of the imaging apparatus 12 by moving the imaging apparatus 12 under control of the CPU 20. The drive unit 27 includes a motor or the like and moves the mobile type apparatus 10 by transmitting a drive force from the motor to the wheels under control of the CPU 20. The distance measurement unit 28 measures a distance between the mobile type apparatus 10 and the delivery target U. Examples of the distance measurement unit 28 include a twin lens camera, an infrared sensor, and an ultrasonic sensor.

Figure 3:
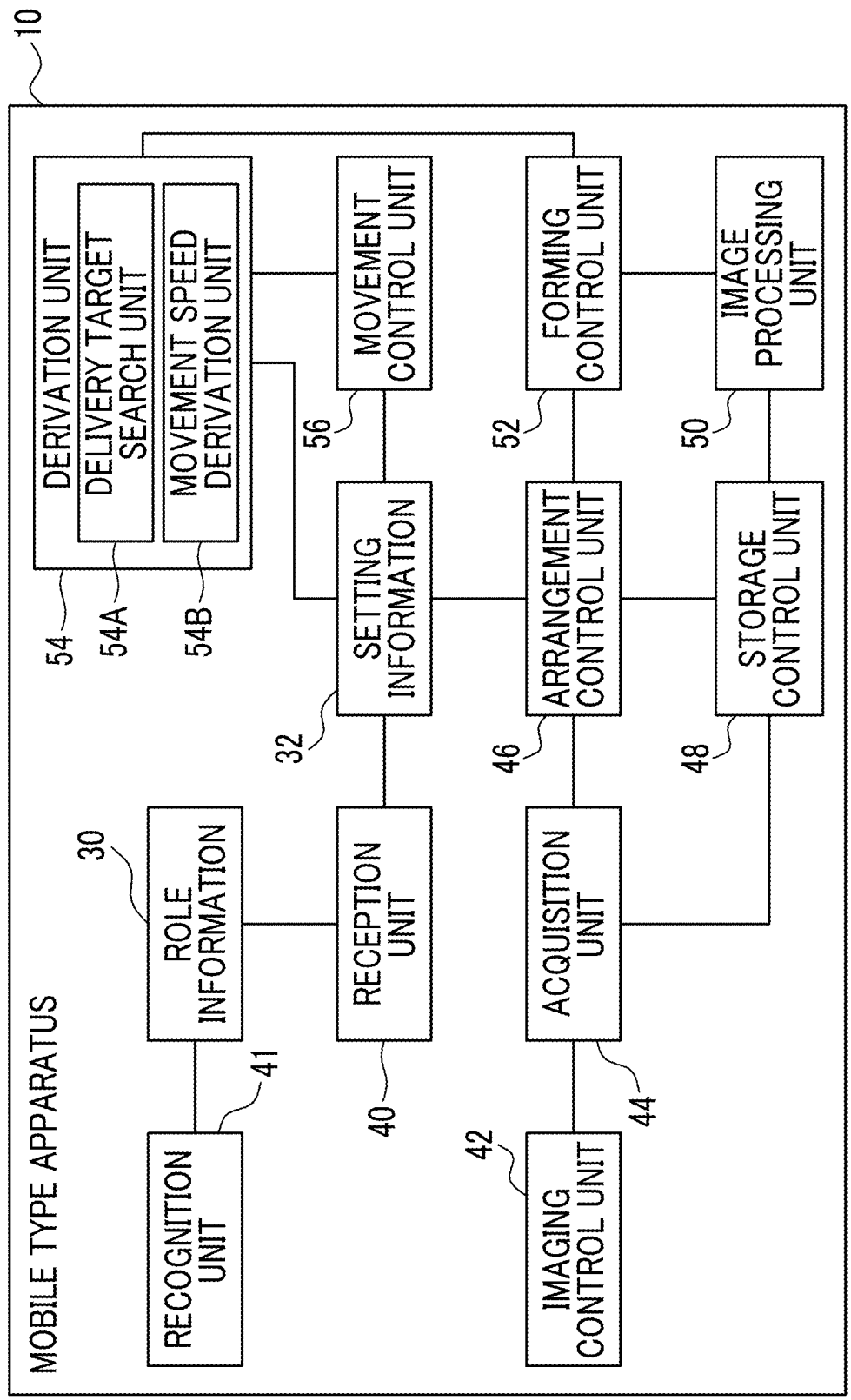
FIG. 3 is a block diagram illustrating one example of a functional configuration of the mobile type apparatus according to the first embodiment.

Next, a functional configuration of the mobile type apparatus 10 according to the present embodiment will be described with reference to FIG. 3. As illustrated in FIG. 3, the mobile type apparatus 10 includes a reception unit 40, a recognition unit 41, an imaging control unit 42, an acquisition unit 44, an arrangement control unit 46, a storage control unit 48, an image processing unit 50, a forming control unit 52, a derivation unit 54, and a movement control unit 56. The derivation unit 54 includes a delivery target search unit 54A and a movement speed derivation unit 54B. The CPU 20 functions as the reception unit 40, the recognition unit 41, the imaging control unit 42, the acquisition unit 44, the arrangement control unit 46, the storage control unit 48, the image processing unit 50, the forming control unit 52, the derivation unit 54, and the movement control unit 56 by executing a program prestored in the storage unit 22.

The reception unit 40 receives the role information 30 input by a terminal such as a smartphone and stores the received role information 30 in the storage unit 22. The role information 30 includes information indicating a role of the mobile type apparatus 10. Specifically, the role information 30 stored in the storage unit 22 of the mobile type apparatus 10A includes information indicating the imaging responsibility. The role information 30 stored in the storage unit 22 of the mobile type apparatus 10B includes information indicating the imaging target.

In a case where assignment of the role of the imaging responsibility is recognized by the recognition unit 41 described later, the reception unit 40 receives the setting information 32 input by the terminal through the communication OF 25 and stores the received setting information 32 in the storage unit 22. The setting information 32 includes imaging target information for specifying the imaging target S. In a case where the imaging target S is a target represented by the common noun described above, examples of the imaging target information include the common noun. In a case where the imaging target S is a target represented by the proper noun described above, examples of the imaging target information include an image of the imaging target S. The setting information 32 also includes imaging target apparatus information for specifying the mobile type apparatus 10B. Examples of the imaging target apparatus information include an image of the mobile type apparatus 10B.

The setting information 32 also includes delivery target information for specifying the delivery target U. Examples of the delivery target information include an image of the delivery target U. The setting information 32 also includes a storage condition of the image. For example, examples of the storage condition of the image include a condition that the imaging target S is present in a predetermined size at a predetermined position (for example, a center position) in the image.

The setting information 32 also includes information indicating a movable range (hereinafter, referred to as a "deliverable range") for delivering the photosensitive recording medium to the delivery target U. Examples of the deliverable range include an upper limit value of a distance in which the mobile type apparatus 10 can move in order to deliver the photosensitive recording medium to the delivery target U. The deliverable range may be a range on a map generated using a map generation method such as simultaneous localization and mapping (SLAM).

The setting information 32 also includes information indicating a range (hereinafter, referred to as an acquirable range) of a distance in which the delivery target U can acquire the photosensitive recording medium discharged in the deliverable state by the discharge unit 16. Examples of the acquirable range include the upper limit value of the distance in which the delivery target U can acquire the photosensitive recording medium discharged in the deliverable state by the discharge unit 16.

The recognition unit 41 recognizes whether the role of the imaging target is assigned or the role of the imaging responsibility is assigned to a host apparatus, in accordance with the role information 30 stored in the storage unit 22. The imaging control unit 42, the acquisition unit 44, the arrangement control unit 46, the storage control unit 48, the image processing unit 50, the forming control unit 52, the derivation unit 54, and the movement control unit 56 function in the mobile type apparatus 10A to which the recognition unit 41 recognizes assignment of the role of the imaging responsibility.

The imaging control unit 42 controls the imaging apparatus 12 to capture an image. The acquisition unit 44 acquires the image obtained by imaging performed by the imaging apparatus 12. The arrangement control unit 46 performs a control for arranging the imaging target S and the mobile type apparatus 10B within an angle of view of the imaging apparatus 12. In the present embodiment, the arrangement control unit 46 performs image analysis processing such as face recognition processing on the image acquired by the acquisition unit 44. By this image analysis processing, the arrangement control unit 46 determines whether or not the imaging target S specified by the imaging target information included in the setting information 32 and the mobile type apparatus 10B specified by the imaging target apparatus information are present in the image and the imaging target S satisfies the storage condition of the image included in the setting information 32.

In a case where this determination results in a negative determination, the arrangement control unit 46 performs at least one of changing the height and the attitude of the imaging apparatus 12 by controlling the movement mechanism 26, moving the mobile type apparatus 10 by controlling the drive unit 27, or changing a zoom magnification of the imaging apparatus 12. Accordingly, the arrangement control unit 46 performs the control for arranging the imaging target S and the mobile type apparatus 10B within the angle of view of the imaging apparatus 12.

In a case where the above determination performed by the arrangement control unit 46 results in a positive determination, the storage control unit 48 performs a control for storing the image acquired by the acquisition unit 44 in the storage unit 22. The image processing unit 50 performs image processing of processing the image stored in the storage unit 22 under control of the storage control unit 48. Examples of the image processing include adjustment of brightness of the image, adjustment of a degree of blurriness of the image, removal of a noise of the image, superimposition of a text on the image, and superimposition of other images such as a character on the image.

In a case where the above determination performed by the arrangement control unit 46 results in a positive determination, the forming control unit 52 controls the image forming apparatus 14 to form, on the photosensitive recording medium, the image subjected to the image processing performed by the image processing unit 50. The delivery target search unit 54A searches for the delivery target U. In the present embodiment, in the same manner as the arrangement control unit 46, the delivery target search unit 54A performs the image analysis processing such as the face recognition processing on the image acquired by the acquisition unit 44. By this image analysis processing, the delivery target search unit 54A determines whether or not the delivery target U specified by the delivery target information included in the setting information 32 is present in the image. In a case where this determination results in a negative determination, the delivery target search unit 54A performs at least one of changing the height and the attitude of the imaging apparatus 12 by controlling the movement mechanism 26, moving the mobile type apparatus 10 by controlling the drive unit 27, or changing the zoom magnification of the imaging apparatus 12. The delivery target search unit 54A searches for the delivery target U by repeating this processing until the delivery target U is present in the image. In a case where the delivery target U possesses a terminal such as a smartphone, the delivery target search unit 54A may search for the delivery target U by performing wireless communication with the terminal.

For the searched delivery target U, the movement speed derivation unit 54B derives a movement speed illustrated below from a distance to the delivery target U measured by the distance measurement unit 28 and a time period required from a start of forming of the image by the forming control unit 52 until completion of discharge performed by the discharge unit 16. That is, in this case, the movement speed derivation unit 54B derives, from the distance and the time period, the movement speed at which the photosensitive recording medium becomes the deliverable state at a position at which the photosensitive recording medium can be delivered to the delivery target U.

Specifically, the movement speed derivation unit 54B derives the movement speed by dividing the distance by the time period in accordance with Expression (1) below. In Expression (1), V denotes the movement speed at which the photosensitive recording medium becomes the deliverable state at the position at which the photosensitive recording medium can be delivered to the delivery target U. In addition, in Expression (1), D denotes the distance to the delivery target U measured by the distance measurement unit 28. In addition, in Expression (1), T denotes the time period required from the start of forming of the image by the forming control unit 52 until completion of discharge performed by the discharge unit 16.

$$V=D\div T \tag{1}$$

The movement speed derived by Expression (1) is one example and is not limited to this example. For example, the movement speed may be preset.

The movement control unit 56 controls movement of the mobile type apparatus 10 for delivering the photosensitive recording medium to the delivery target U by controlling the drive unit 27. Specifically, the movement control unit 56 controls the drive unit 27 such that the mobile type apparatus 10 moves toward the delivery target U at the movement speed derived by the movement speed derivation unit 54B.

The mobile type apparatus 10 according to the present embodiment starts controlling movement by the movement control unit 56 described above and starts forming the image by the forming control unit 52 at the same timing. These two starts may not be performed at the same timing. For example, forming of the image by the forming control unit 52 may be started after controlling of movement by the movement control unit 56 is started. In this case, the forming control unit 52 starts forming the image before movement of the mobile type apparatus 10 into the acquirable range is completed. Alternatively, for example, controlling of movement by the movement control unit 56 may be started after forming of the image by the forming control unit 52 is started. In this case, the movement control unit 56 starts controlling movement before discharge, by the discharge unit 16, of the photosensitive recording medium on which the image is formed is completed. That is, the mobile type apparatus 10 causes at least a partial period to overlap between a period from the start of forming of the image on the photosensitive recording medium by the forming control unit 52 until completion of discharge of the photosensitive recording medium by the discharge unit 16, and a period from the start of movement under control of the movement control unit 56 until completion of the movement.

Figure 4:
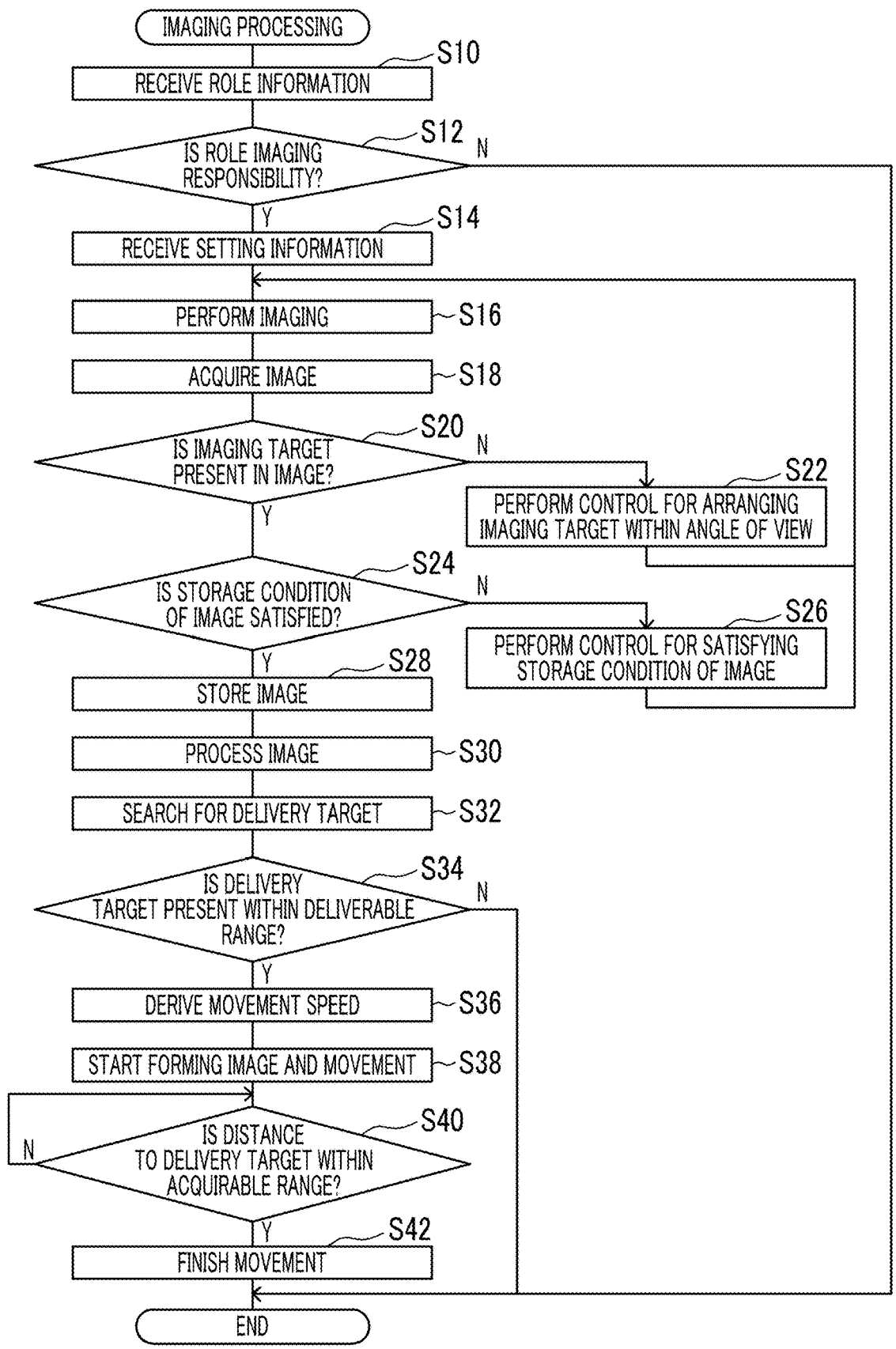
FIG. 4 is a flowchart illustrating one example of imaging processing according to the first embodiment.

Next, an effect of the imaging system 100 according to the present embodiment will be described with reference to FIG. 4. Imaging processing illustrated in FIG. 4 is executed by causing the CPU 20 to execute the program stored in the storage unit 22. The imaging processing illustrated in FIG. 4 is executed in a case where the mobile type apparatus 10 receives the role information 30 input by the terminal such as a smartphone.

In step S10 in FIG. 4, the reception unit 40 receives, through the communication I/F 25, the role information 30 input by the terminal such as a smartphone and stores the received role information 30 in the storage unit 22. In step S12, the recognition unit 41 recognizes whether the role of the imaging target is assigned or the role of the imaging responsibility is assigned to the host apparatus, in accordance with the role information 30 stored in the storage unit 22 by processing in step S10. The recognition unit 41 determines whether or not the role of the imaging responsibility is assigned. In a case where this determination results in a positive determination, processing transitions to step S14. In a case of a negative determination, the recognition unit 41 determines that the role of the imaging target is assigned, and the imaging processing is finished. That is, processing from step S14 to step S42 below is executed by the mobile type apparatus 10A.

In step S14, the reception unit 40 receives, through the communication I/F 25, the setting information 32 input by the terminal such as a smartphone and stores the received setting information 32 in the storage unit 22. While the reception unit 40 receives the setting information 32 after receiving the role information 30 in the present embodiment, the disclosure is not limited thereto. The reception unit 40 may perform processing of receiving the role information 30 and the setting information 32 in parallel or may receive the role information 30 after receiving the setting information 32. In step S16, the imaging control unit 42 controls the imaging apparatus 12 to capture an image. In step S18, the acquisition unit 44 acquires the image obtained by imaging performed by the imaging apparatus 12 by processing in step S16.

In step S20, as described above, the arrangement control unit 46 determines whether or not the imaging target S specified by the imaging target information included in the setting information 32 received by processing in step S14 and the mobile type apparatus 10B specified by the imaging target apparatus information are present in the image acquired by processing in step S18. In a case where this determination results in a negative determination, processing transitions to step S22. In a case of a positive determination, processing transitions to step S24.

In step S22, the arrangement control unit 46 performs at least one of changing the height and the attitude of the imaging apparatus 12 by controlling the movement mechanism 26, moving the mobile type apparatus 10A by controlling the drive unit 27, or changing the zoom magnification of the imaging apparatus 12. Accordingly, the arrangement control unit 46 performs the control for arranging the imaging target S and the mobile type apparatus 10B within the angle of view of the imaging apparatus 12. In a case where processing in step S22 is finished, processing returns to step S16.

In step S24, as described above, the arrangement control unit 46 determines whether or not the imaging target S specified by the imaging target information included in the setting information 32 received by processing in step S14 satisfies the storage condition of the image included in the setting information 32. In a case where this determination results in a negative determination, processing transitions to step S26. In a case of a positive determination, processing transitions to step S28.

In step S26, the arrangement control unit 46 performs at least one of changing the height and the attitude of the imaging apparatus 12 by controlling the movement mechanism 26, moving the mobile type apparatus 10A by controlling the drive unit 27, or changing the zoom magnification of the imaging apparatus 12. Accordingly, the arrangement control unit 46 performs a control such that the imaging target S satisfies the storage condition of the image. In a case where processing in step S26 is finished, processing returns to step S16.

In step S28, the storage control unit 48 performs the control for storing the image acquired by processing in step S18 in the storage unit 22. In step S30, as described above, the image processing unit 50 performs the image processing of processing the image stored in the storage unit 22 under control of processing in step S28. In step S32, as described above, the delivery target search unit 54A searches for the delivery target U.

In step S34, the delivery target search unit 54A determines whether or not the delivery target U searched by processing in step S32 is present within the deliverable range included in the setting information 32 received by processing in step S14. In a case where this determination results in a negative determination, the imaging processing is finished. In a case of a positive determination, processing transitions to step S36.

In step S36, for the delivery target U searched by processing in step S32, the movement speed derivation unit 54B derives the movement speed in accordance with Expression (1) from the distance to the delivery target U measured by the distance measurement unit 28 and the time period required from the start of forming of the image by the forming control unit 52 until completion of discharge performed by the discharge unit 16.

In step S38, the forming control unit 52 performs a control for forming, on the photosensitive recording medium, the image subjected to the image processing by processing in step S30. At the same timing as this control, the movement control unit 56 controls the drive unit 27 such that the mobile type apparatus 10A moves toward the delivery target U at the movement speed derived by processing in step S36. That is, by these controls, forming of the image by the image forming apparatus 14 and movement of the mobile type apparatus 10A are started at the same timing. Forming of the image by the image forming apparatus 14 is continuously performed until discharge of the photosensitive recording medium by the discharge unit 16 is completed. Movement of the mobile type apparatus 10A is continuously performed until step S42 described later is executed.

In step S40, the movement control unit 56 determines whether or not the distance to the delivery target U measured by the distance measurement unit 28 is within the acquirable range included in the setting information 32 received by processing in step S14. In a case where this determination results in a negative determination, step S40 is executed again at a predetermined time interval. In a case of a positive determination, processing transitions to step S42.

In step S42, the movement control unit 56, by controlling the drive unit 27, finishes movement of the mobile type apparatus 10A started by processing in step S38. In a case where processing in step S42 is finished, the imaging processing is finished. The delivery target U acquires the photosensitive recording medium discharged from the discharge unit 16 of the image forming apparatus 14 of the mobile type apparatus 10A that has moved to a vicinity of the delivery target U. Processing may return to step S16 after finish of step S42. In this case, processing from step S16 to step S42 may be repeatedly executed a plurality of times using the setting information 32 received once.

As described above, according to the present embodiment, whether the role of the imaging target is assigned or the role of the imaging responsibility is assigned is recognized. In a case where assignment of the role of the imaging responsibility is recognized, the image obtained by imaging performed by the imaging apparatus is acquired, and the acquired image is stored. Accordingly, an effort required for the imaging target to image a photograph together with the mobile type apparatus can be reduced.

Second Embodiment

Figure 5:
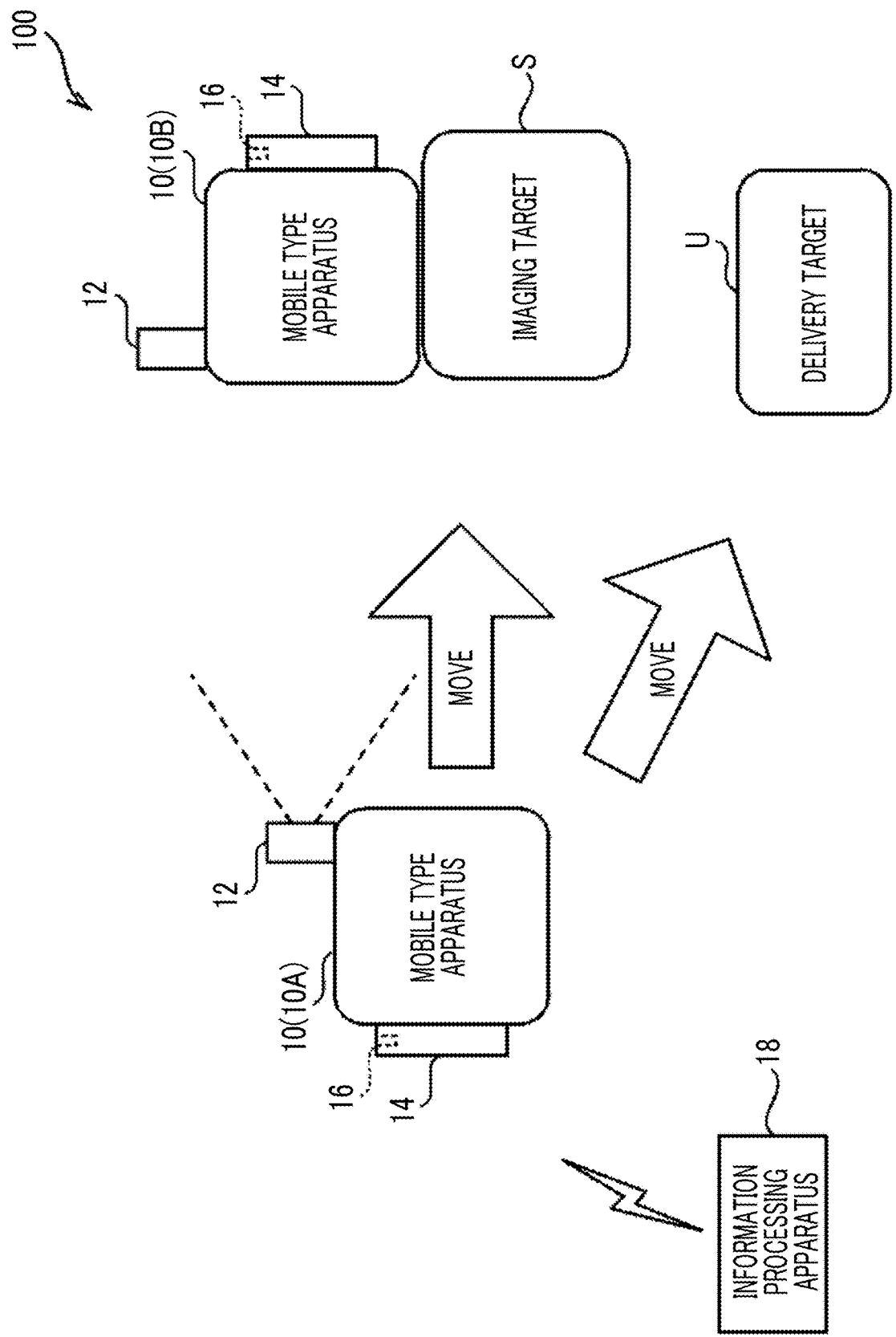
FIG. 5 is a block diagram illustrating one example of a configuration of an imaging system according to a second embodiment.

A second embodiment of the technology of the disclosure will be described. The same constituents as the first embodiment will be designated by the same reference signs and will not be described here. First, a configuration of the imaging system 100 according to the present embodiment will be described with reference to FIG. 5. As illustrated in FIG. 5, the imaging system 100 includes the same mobile type apparatus 10 as the first embodiment and an information processing apparatus 18. Each mobile type apparatus 10 and the information processing apparatus 18 are communicably connected to each other by wireless communication. Examples of the information processing apparatus 18 include a personal computer or a server computer. A hardware configuration of the mobile type apparatus 10 is the same as the first embodiment and thus, will not be described here.

Figure 6:
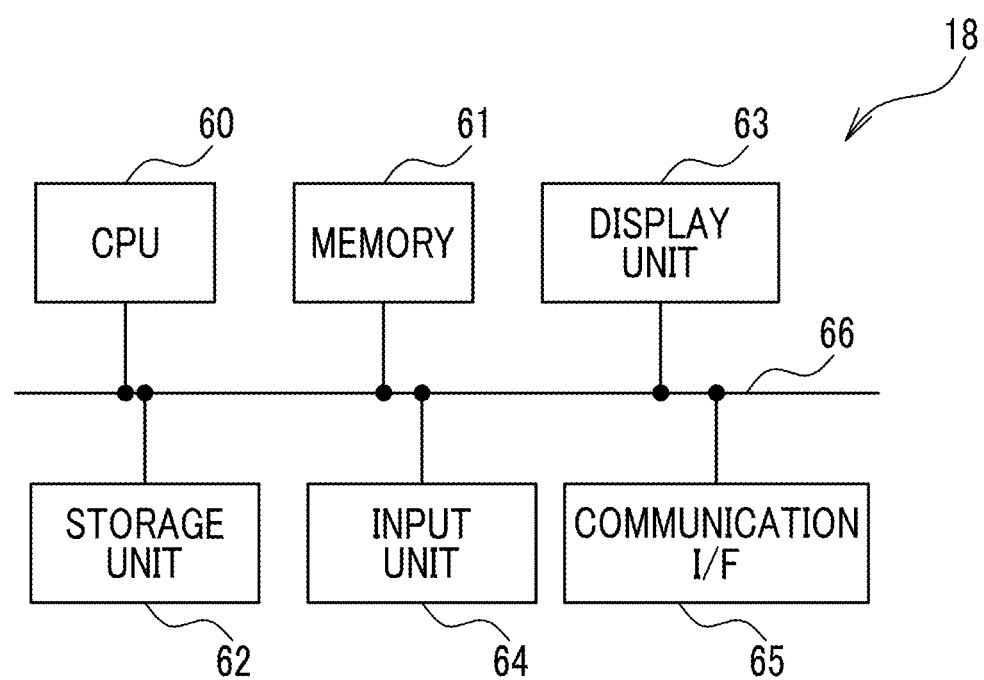
FIG. 6 is a block diagram illustrating one example of a hardware configuration of an information processing apparatus according to the second embodiment.

Next, a hardware configuration of the information processing apparatus 18 will be described with reference to FIG. 6. As illustrated in FIG. 6, the information processing apparatus 18 comprises a CPU 60, a memory 61 as a temporary storage region, and a non-volatile storage unit 62. In addition, the information processing apparatus 18 comprises a display unit 63 such as a liquid crystal display, an input unit 64 such as a mouse and a keyboard, and a communication I/F 65 used for communication with the mobile type apparatus 10. The CPU 60, the memory 61, the storage unit 62, the display unit 63, the input unit 64, and the communication I/F 65 are connected through a bus 66.

Figure 7:
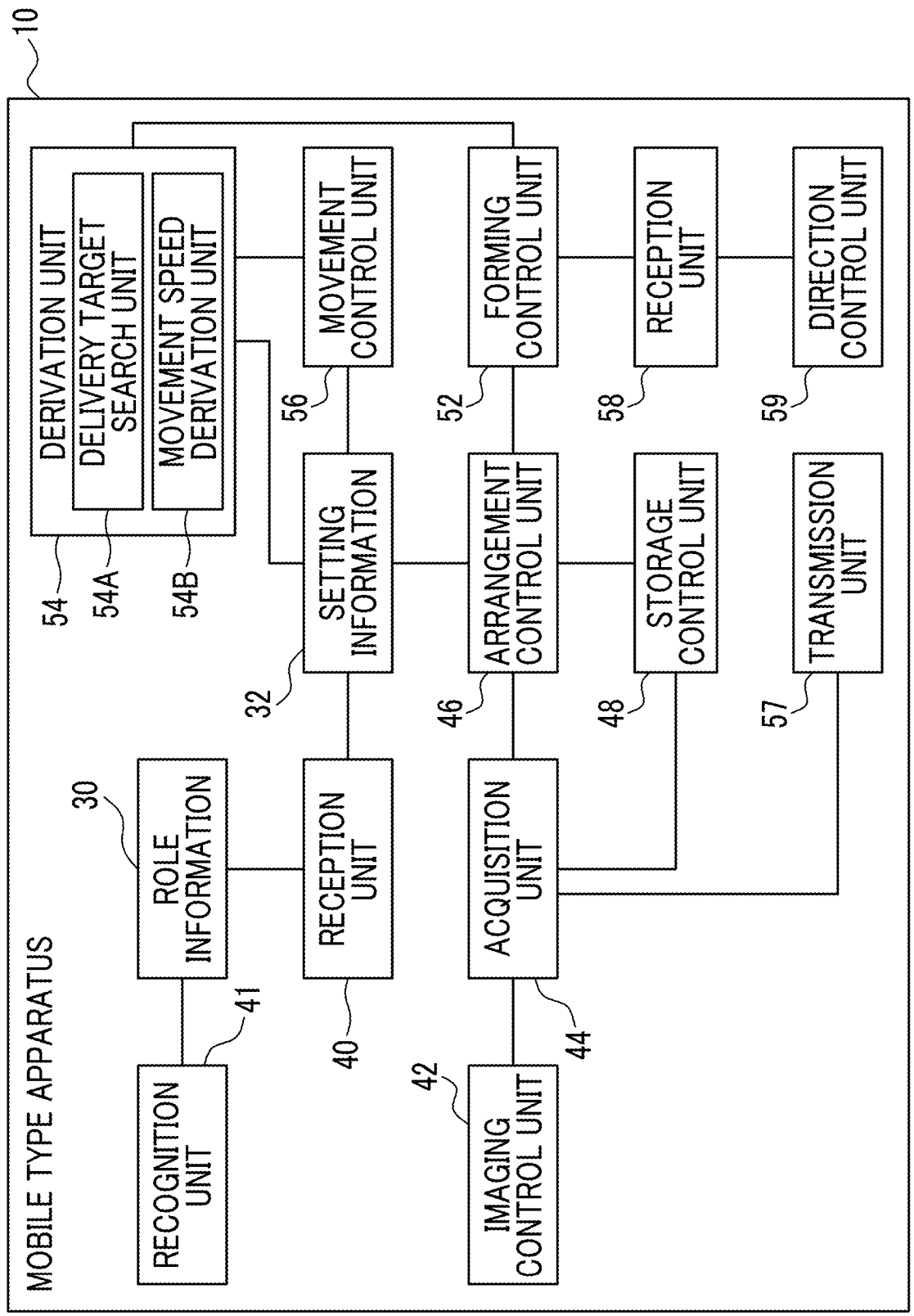
FIG. 7 is a block diagram illustrating one example of a functional configuration of the mobile type apparatus according to the second embodiment.

Next, a functional configuration of the mobile type apparatus 10 according to the present embodiment will be described with reference to FIG. 7. As illustrated in FIG. 7, the mobile type apparatus 10 includes the reception unit 40, the imaging control unit 42, the acquisition unit 44, the arrangement control unit 46, the storage control unit 48, the forming control unit 52, the derivation unit 54, the movement control unit 56, a transmission unit 57, a reception unit 58, and a direction control unit 59. The derivation unit 54 includes the delivery target search unit 54A and the movement speed derivation unit 54B. The CPU 20 functions as the reception unit 40, the imaging control unit 42, the acquisition unit 44, the arrangement control unit 46, the storage control unit 48, the forming control unit 52, the derivation unit 54, the movement control unit 56, the transmission unit 57, the reception unit 58, and the direction control unit 59 by executing the program prestored in the storage unit 22. The direction control unit 59 functions in the mobile type apparatus 10B to which the recognition unit 41 recognizes assignment of the role of the imaging target.

In a case where the above determination performed by the arrangement control unit 46 results in a positive determination, the transmission unit 57 transmits the image acquired by the acquisition unit 44 to the information processing apparatus 18 through the communication I/F 25. In addition, the transmission unit 57 transmits positional information of the mobile type apparatus 10 itself to the information processing apparatus 18 through the communication I/F 25. This positional information can be obtained by, for example, a global positioning system (GPS).

The reception unit 58 receives, through the communication I/F 25, an image transmitted from the information processing apparatus 18. In addition, the reception unit 58 receives, through the communication I/F 25, positional information transmitted from the information processing apparatus 18.

In a case where the recognition unit 41 recognizes assignment of the role of the imaging target, the direction control unit 59 performs a control for directing a front surface of the mobile type apparatus 10B itself toward the mobile type apparatus 10A by controlling the drive unit 27 using positional information of the mobile type apparatus 10A received by the reception unit 58. In a case where the mobile type apparatus 10B is an apparatus such as a robot having a head portion, the direction control unit 59 may perform a control for directing a front surface (that is, a face) of the head portion instead of the entire mobile type apparatus 10B toward the mobile type apparatus 10A.

Figure 8:
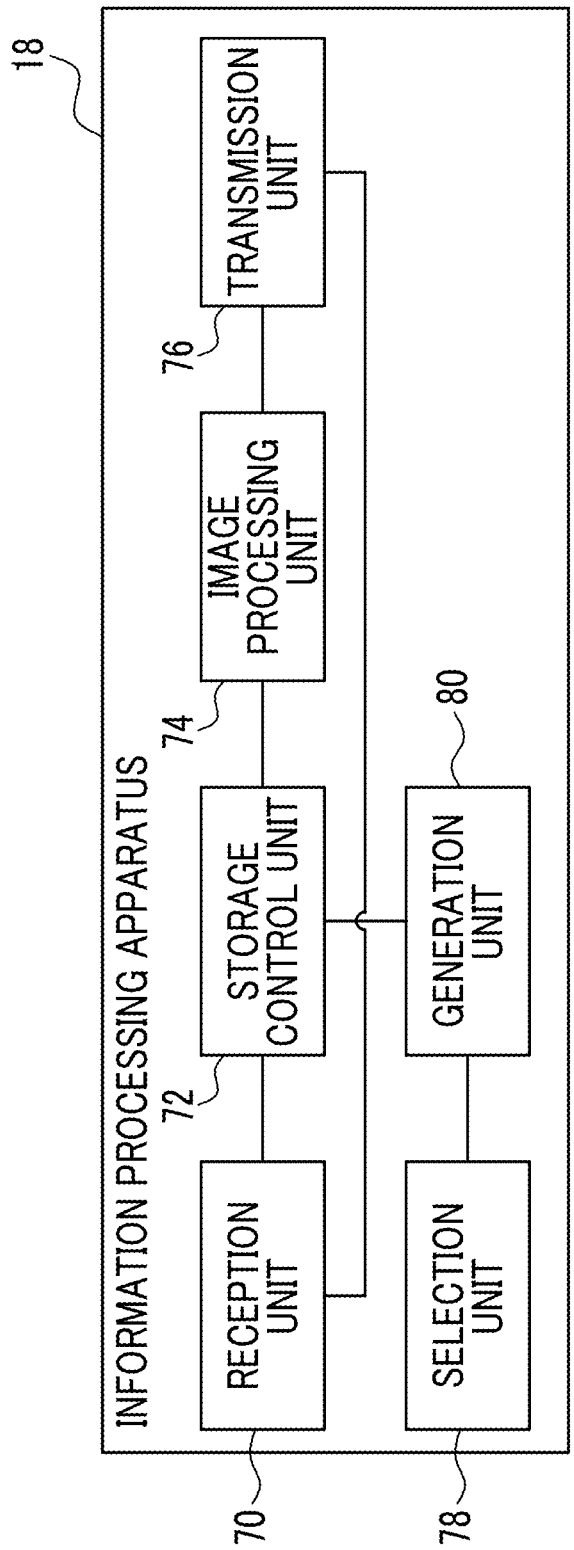
FIG. 8 is a block diagram illustrating one example of a functional configuration of the information processing apparatus according to the second embodiment.

Next, a functional configuration of the information processing apparatus 18 according to the present embodiment will be described with reference to FIG. 8. As illustrated in FIG. 8, the information processing apparatus 18 includes a reception unit 70, a storage control unit 72, an image processing unit 74, a transmission unit 76, a selection unit 78, and a generation unit 80. The CPU 60 functions as the reception unit 70, the storage control unit 72, the image processing unit 74, the transmission unit 76, the selection unit 78, and the generation unit 80 by executing a program prestored in the storage unit 62.

The reception unit 70 receives, through the communication I/F 65, the image transmitted from the mobile type apparatus 10A. In addition, the reception unit 70 receives, through the communication I/F 65, the positional information transmitted from the mobile type apparatus 10B to which the role of the imaging target is assigned, and the positional information transmitted from the mobile type apparatus 10A to which the role of the imaging responsibility is assigned.

The storage control unit 72 performs a control for storing the image received by the reception unit 70 in the storage unit 62. In addition, the storage control unit 72 performs a control for storing, in the storage unit 62, data for creating a photo album generated by the generation unit 80 described later. In the same manner as the image processing unit 50 according to the first embodiment, the image processing unit 74 performs image processing of processing the image stored in the storage unit 62 under control of the storage control unit 72.

The transmission unit 76 transmits the image subjected to the image processing by the image processing unit 74 to the mobile type apparatus 10A through the communication I/F 65. In addition, the transmission unit 76 transmits the positional information of the mobile type apparatus 10A received by the reception unit 70 to the mobile type apparatus 10B through the communication I/F 65. In addition, the transmission unit 76 transmits positional information of the mobile type apparatus 10B received by the reception unit 70 to the mobile type apparatus 10A through the communication I/F 65.

The selection unit 78 selects an image satisfying a predetermined selection condition from images stored in the storage unit 62. Examples of the selection condition include an image in which a person in the image is smiling, and an image in which a specific person is captured. The selection unit 78 may select the image satisfying the selection condition from images subjected to the image processing by the image processing unit 74.

The generation unit 80 generates the data for creating the photo album using the image selected by the selection unit 78. The photo album is created using this data.

Next, an effect of the imaging system 100 according to the present embodiment will be described with reference to FIG. 9 to FIG. 12. Positional information update processing illustrated in FIG. 9 is periodically executed after each mobile type apparatus 10 recognizes a role by processing in step S12 of imaging processing illustrated in FIG. 10.

Figure 10:
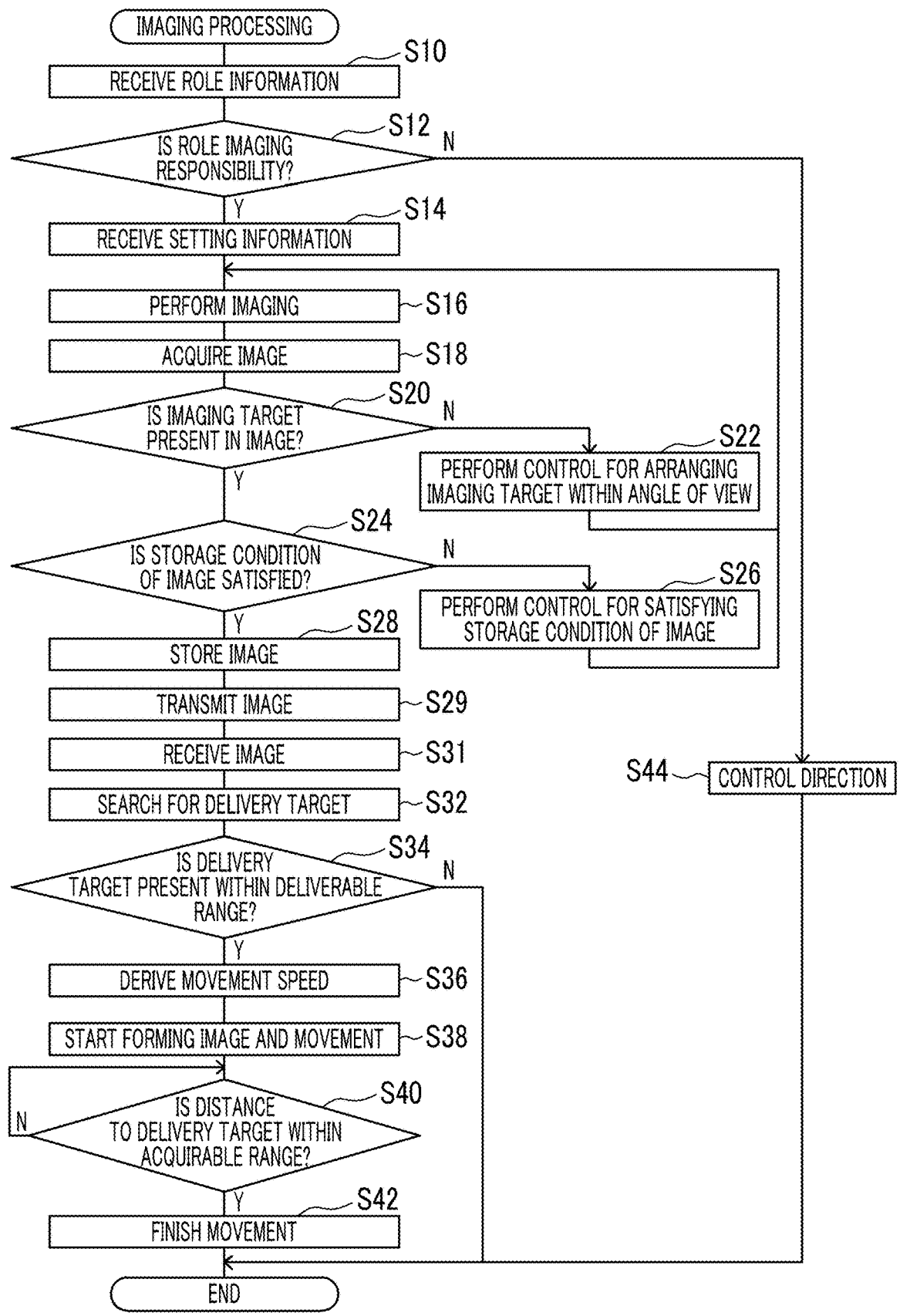
FIG. 10 is a flowchart illustrating one example of imaging processing according to the second embodiment.

The imaging processing illustrated in FIG. 10 is executed by causing the CPU 20 to execute the program stored in the storage unit 22. The imaging processing illustrated in FIG. 10 is executed in a case where the mobile type apparatus 10 receives the role information 30 input by the terminal such as a smartphone. In FIG. 10, steps executing the same processing as FIG. 4 will be designated by the same reference signs and will not be described here.

Figure 11:
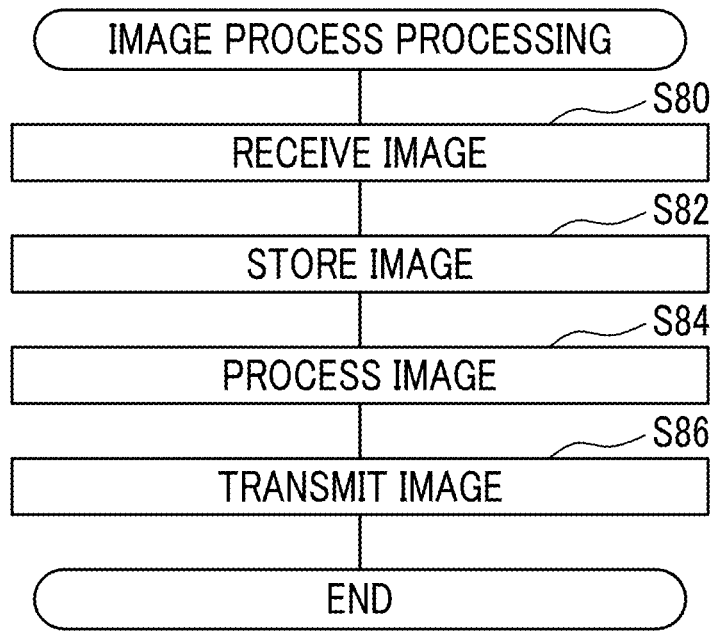
FIG. 11 is a flowchart illustrating one example of image process processing according to the second embodiment.
Figure 12:
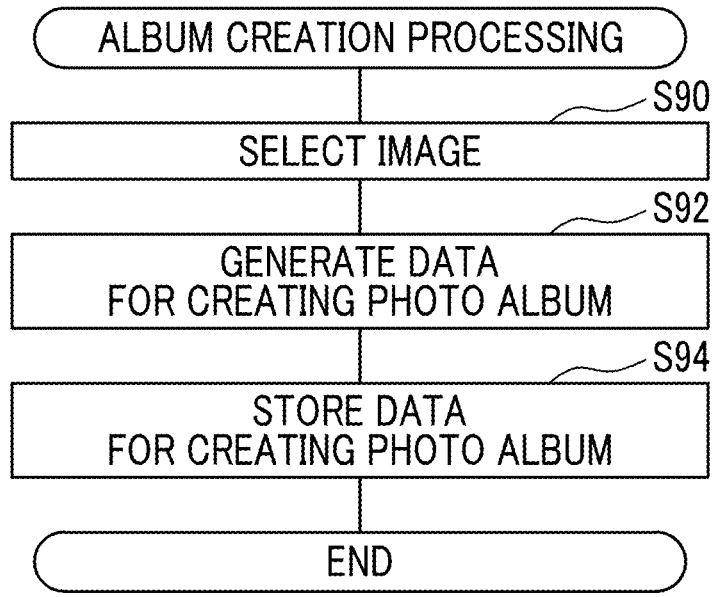
FIG. 12 is a flowchart illustrating one example of album creation processing according to the second embodiment.

Image process processing illustrated in FIG. 11 and album creation processing illustrated in FIG. 12 are executed by causing the CPU 60 to execute the program stored in the storage unit 62. For example, the image process processing illustrated in FIG. 11 is executed in a case where the information processing apparatus 18 receives the image transmitted from the mobile type apparatus 10A. For example, the album creation processing illustrated in FIG. 12 is executed in a case where an instruction to start executing processing is input through the input unit 64.

Figure 9:
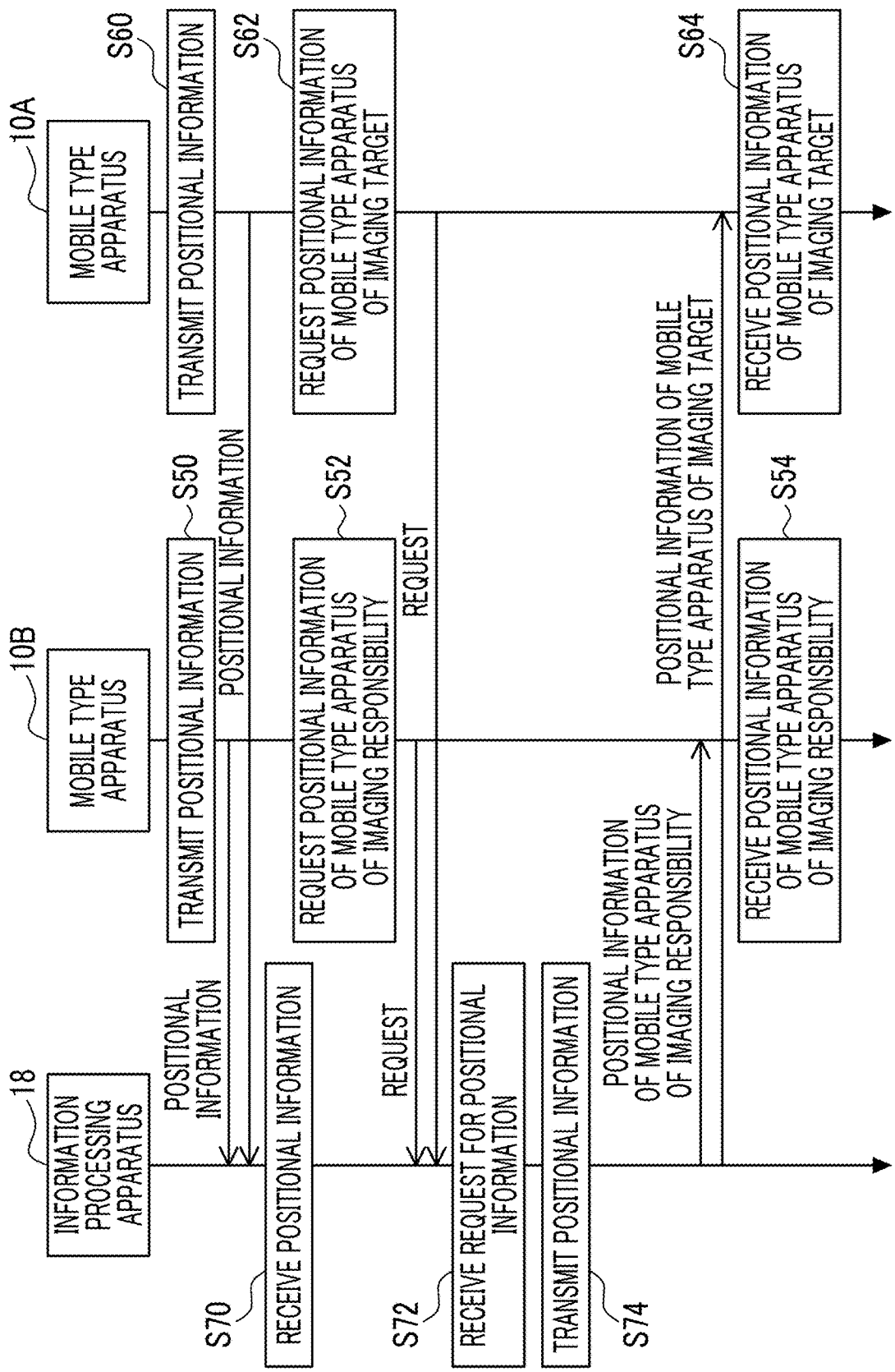
FIG. 9 is a sequence diagram illustrating one example of positional information update processing according to the second embodiment.

In step S50 in FIG. 9, the transmission unit 57 of the mobile type apparatus 10B transmits the positional information of the mobile type apparatus 10B itself to the information processing apparatus 18 through the communication I/F 25. In step S60, the transmission unit 57 of the mobile type apparatus 10A transmits the positional information of the mobile type apparatus 10A itself to the information processing apparatus 18 through the communication I/F 25. In step S70, the reception unit 70 of the information processing apparatus 18 receives, through the communication I/F 65, the positional information transmitted from the mobile type apparatus 10B by processing in step S50 and the positional information transmitted from the mobile type apparatus 10A by processing in step S60.

In step S52, the transmission unit 57 of the mobile type apparatus 10B transmits information indicating a request for the positional information of the mobile type apparatus 10A of the imaging responsibility to the information processing apparatus 18 through the communication I/F 25. In step S62, the transmission unit 57 of the mobile type apparatus 10A transmits information indicating a request for the positional information of the mobile type apparatus 10B of the imaging target to the information processing apparatus 18 through the communication I/F 25. In step S72, the reception unit 70 of the information processing apparatus 18 receives, through the communication I/F 65, the information transmitted from the mobile type apparatus 10B by processing in step S52 and the information transmitted from the mobile type apparatus 10A by processing in step S62.

In step S74, the transmission unit 76 of the information processing apparatus 18 transmits the positional information of the mobile type apparatus 10B received by processing in step S70 to the mobile type apparatus 10A through the communication I/F 65. In addition, the transmission unit 76 of the information processing apparatus 18 transmits the positional information of the mobile type apparatus 10A received by processing in step S70 to the mobile type apparatus 10B through the communication I/F 65.

In step S54, the reception unit 58 of the mobile type apparatus 10B receives, through the communication I/F 25, the positional information of the mobile type apparatus 10A of the imaging responsibility transmitted from the information processing apparatus 18 by processing in step S74. In step S64, the reception unit 58 of the mobile type apparatus 10A receives, through the communication I/F 25, the positional information of the mobile type apparatus 10B of the imaging target transmitted from the information processing apparatus 18 by processing in step S74. By periodically executing the positional information update processing described above, the mobile type apparatus 10A acquires the most recent positional information of the mobile type apparatus 10B, and the mobile type apparatus 10B acquires the most recent positional information of the mobile type apparatus 10A.

For example, in step S22 illustrated in FIG. 10, the arrangement control unit 46 may perform the above control such that the angle of view of the imaging apparatus 12 is directed in a direction of a position indicated by the most recent positional information of the mobile type apparatus 10B. Accordingly, a time period until the imaging target S and the mobile type apparatus 10B are arranged within the angle of view of the imaging apparatus 12 of the mobile type apparatus 10A can be shortened.

In step S29 in FIG. 10, the transmission unit 57 of the mobile type apparatus 10A transmits the image acquired by processing in step S18 to the information processing apparatus 18 through the communication I/F 25. In step S31, the reception unit 58 of the mobile type apparatus 10A receives, through the communication I/F 25, the image transmitted from the information processing apparatus 18 by processing in step S86 of the image process processing described later. In step S38, a control for forming the image received by processing in step S31 on the photosensitive recording medium is performed. Even in the present embodiment, processing may return to step S16 after finish of step S42. In this case, processing from step S16 to step S42 may be repeatedly executed a plurality of times using the setting information 32 received once.

In a case where the determination in step s12 results in a negative determination, the recognition unit 41 determines that the role of the imaging target is assigned, and processing transitions to step S44. That is, processing in step S44 is executed by the mobile type apparatus 10B. In step S44, the direction control unit 59 of the mobile type apparatus 10B performs the control for directing the front surface of the mobile type apparatus 10B itself toward the mobile type apparatus 10A by controlling the drive unit 27 using the most recent positional information of the mobile type apparatus 10A. In a case where processing in step S44 is finished, the imaging processing is finished.

In step S80 in FIG. 11, the reception unit 70 receives, through the communication I/F 65, the image transmitted from the mobile type apparatus 10A by processing in step S29 of the imaging processing. In step S82, the storage control unit 72 performs the control for storing the image received by processing in step S80 in the storage unit 62.

In step S84, the image processing unit 74 performs the image processing of processing the image stored in the storage unit 62 by processing in step S82. In step S86, the transmission unit 76 transmits the image subjected to the image processing by processing in step S84 to the mobile type apparatus 10A through the communication I/F 65. In a case where processing in step S86 is finished, the image process processing is finished.

In step S90 in FIG. 12, as described above, the selection unit 78 selects the image satisfying the selection condition from the images stored in the storage unit 62. In step S92, the generation unit 80 generates the data for creating the photo album using the image selected by processing in step S90. In step S94, the storage control unit 72 performs the control for storing, in the storage unit 62, the data for creating the photo album generated by processing in step S92. In a case where processing in step S94 is finished, the album creation processing is finished.

As described above, according to the present embodiment, the same effect as the first embodiment can be accomplished.

In each of the embodiments, in a case where the determination performed by the arrangement control unit 46 results in a positive determination, the acquisition unit 44 may acquire a plurality of images consecutively captured by the imaging apparatus 12. In this case, a form in which the forming control unit 52 controls the image forming apparatus 14 to form at least one of the plurality of images acquired by the acquisition unit 44 on the photosensitive recording medium is illustrated. Furthermore, in this case, a form in which the forming control unit 52 performs a control for selecting an image satisfying a preset selection condition, such as an image having the smallest blurriness amount, the brightest image, and an image in which the imaging target S opens eyes, from the plurality of images and forming the selected image on the photosensitive recording medium is illustrated.

While a case where a condition that the imaging target S is present in a predetermined size at a predetermined position in the image is applied as the storage condition of the image is described in each of the embodiments, the disclosure is not limited thereto. For example, a condition that a predetermined gesture (for example, a peace sign) is performed by the imaging target S may be applied as the storage condition of the image. Alternatively, for example, a condition that a predetermined sound is input into the mobile type apparatus 10 may be applied as the storage condition of the image.

In each of the embodiments, a form in which the mobile type apparatus 10 recognizes, in accordance with a gesture predetermined depending on the role, whether the role of the imaging target is assigned or the role of the imaging responsibility is assigned to the host apparatus may be available. In this case, a form in which the mobile type apparatus 10 recognizes assignment of the role of the imaging target in a case where a gesture corresponding to the role of the imaging target is performed by the imaging target S is illustrated. In addition, in this case, a form in which the mobile type apparatus 10 recognizes assignment of the role of the imaging responsibility in a case where a gesture corresponding to the role of the imaging responsibility is performed by the imaging target S is illustrated.

In each of the embodiments, a form in which the mobile type apparatus 10 recognizes, in accordance with a sound predetermined depending on the role, whether the role of the imaging target is assigned or the role of the imaging responsibility is assigned to the host apparatus may be available. In this case, a form in which the mobile type apparatus 10 recognizes assignment of the role of the imaging target in a case where a voice corresponding to the role of the imaging target is emitted by the imaging target S is illustrated. In addition, in this case, a form in which the mobile type apparatus 10 recognizes assignment of the role of the imaging responsibility in a case where a voice corresponding to the role of the imaging responsibility is emitted by the imaging target S is illustrated.

In each of the embodiments, each mobile type apparatus 10 may directly acquire the positional information of the other mobile type apparatus 10 other than the mobile type apparatus 10 itself by wireless communication.

Various types of processing executed by causing the CPU to execute software (program) in each of the embodiments may be executed by various processors other than the CPU. In this case, a programmable logic device (PLD) such as a field-programmable gate array (FPGA) that has a circuit configuration changeable after manufacturing, a dedicated electric circuit such as an application specific integrated circuit (ASIC) that is a processor having a circuit configuration dedicatedly designed to execute a specific type of processing, and the like are illustrated as the processors. The various types of processing may be executed by one of the various processors or may be executed by a combination of two or more processors of the same type or different types (for example, a plurality of FPGAs and a combination of the CPU and the FPGA). A hardware structure of the various processors is specifically an electric circuit in which circuit elements such as semiconductor elements are combined.

While an aspect in which the program is prestored (installed) in the storage units 22 and 62 is described in each of the embodiments, the disclosure is not limited thereto. The program may be provided in a form of a recording on a non-transitory recording medium such as a compact disk read only memory (CD-ROM), a digital versatile disk read only memory (DVD-ROM), and a universal serial bus (USB) memory. Alternatively, a form in which the program is downloaded from an external apparatus through a network may be available.

An object of the present disclosure is to reduce an effort required for an imaging target to image a photograph together with a mobile type apparatus.

An aspect of the present disclosure is an imaging system that includes: a plurality of mobile type apparatuses each including: a first memory; and a first processor being connected to the first memory and being configured to: recognize whether a role of an imaging target is assigned or a role of imaging responsibility is assigned to a host apparatus, in a case where assignment of the role of the imaging responsibility is recognized, acquire an image obtained by imaging performed by an imaging apparatus, in a case where at least one of a preset imaging target or a mobile type apparatus to which the role of the imaging target is assigned is not present in the acquired image, perform a control for arranging, within an angle of view of the imaging apparatus, the preset imaging target and the mobile type apparatus to which the role of the imaging target is assigned, in a case where the preset imaging target and the mobile type apparatus to which the role of the imaging target is assigned are present in the acquired image, perform a control for storing the acquired image in a storage unit, in a case where the preset imaging target and the mobile type apparatus to which the role of the imaging target is assigned are present in the acquired image, perform a control for forming the image on a recording medium, discharge the recording medium on which the image is formed, to a preset delivery target in a deliverable state, and control movement of the mobile type apparatus for delivering the recording medium to the delivery target, wherein the plurality of mobile type apparatuses include at least one mobile type apparatus to which the role of the imaging target is assigned, and at least one mobile type apparatus to which the role of the imaging responsibility is assigned.

Accordingly, an effort required for the imaging target to image a photograph together with the mobile type apparatus can be reduced and the recording medium on which the image is formed can be delivered.

In the imaging system according to the aspect of the present disclosure, each mobile type apparatus may cause at least a partial period to overlap between a period from a start of forming of the image on the recording medium until completion of discharge of the recording medium, and a period from a start of movement until completion of the movement.

Accordingly, the recording medium on which the image is formed can be quickly delivered.

In the imaging system according to the aspect of the present disclosure, each mobile type apparatus may start controlling the movement and start forming the image at the same timing.

Accordingly, the recording medium on which the image is formed can be more quickly delivered.

In the imaging system according to the aspect of the present disclosure, each mobile type apparatus may derive, from a distance to the delivery target and a time period required from a start of forming of the image until completion of discharge, a movement speed at which the recording medium becomes the deliverable state at a position at which the recording medium is deliverable to the delivery target, and may control the movement in accordance with the derived movement speed.

Accordingly, the recording medium can become the deliverable state at the position at which the recording medium on which the image is formed is delivered to the delivery target.

In the imaging system according to the aspect of the present disclosure, the recording medium may be a photosensitive recording medium.

Accordingly, the image can be quickly formed.

In the imaging system according to the aspect of the present disclosure, in a case where the preset imaging target and the mobile type apparatus to which the role of the imaging target is assigned are present in the acquired image, a control for forming at least one of a plurality of images consecutively captured by the imaging apparatus on the recording medium may be performed.

Accordingly, an appropriate image can be formed on the recording medium from the plurality of images.

In the imaging system according to the aspect of the present disclosure, the preset imaging target may be the same as the delivery target.

Accordingly, the imaging target can acquire the recording medium on which the image is formed.

In the imaging system according to the aspect of the present disclosure, the movement in a case where the delivery target is present within a range predetermined as a deliverable range may be controlled.

Accordingly, the recording medium on which the image is recorded can be securely delivered.

In the imaging system according to the aspect of the present disclosure, each mobile type apparatus may perform image processing of processing the acquired image.

Accordingly, image processing desired by a user can be executed.

In the imaging system according to the aspect of the present disclosure, in accordance with a gesture predetermined depending on the role, whether the role of the imaging target is assigned or the role of the imaging responsibility is assigned to the host apparatus may be recognized.

Accordingly, a role of the mobile type apparatus can be easily set.

In the imaging system according to the aspect of the present disclosure, in accordance with a sound predetermined depending on the role, whether the role of the imaging target is assigned or the role of the imaging responsibility is assigned to the host apparatus may be recognized.

Accordingly, a role of the mobile type apparatus can be easily set.

In the imaging system according to the aspect of the present disclosure, each mobile type apparatus may receive, in a case where assignment of the role of the imaging responsibility is recognized, positional information of the mobile type apparatus to which the role of the imaging target is assigned, and receive, in a case where assignment of the role of the imaging target is recognized, positional information of the mobile type apparatus to which the role of the imaging responsibility is assigned.

Accordingly, each mobile type apparatus may recognize a position of another mobile type apparatus.

The imaging system according to the aspect of the present disclosure may further includes: a first information processing apparatus including: a second memory; and a second processor being connected to the second memory and being configured to: receive positional information transmitted from the mobile type apparatus to which the role of the imaging target is assigned, and positional information transmitted from the mobile type apparatus to which the role of the imaging responsibility is assigned, and transmit, to the mobile type apparatus to which the role of the imaging responsibility is assigned, the received positional information of the mobile type apparatus to which the role of the imaging target is assigned, and transmit, to the mobile type apparatus to which the role of the imaging target is assigned, the received positional information of the mobile type apparatus to which the role of the imaging responsibility is assigned, wherein the first processor is configured to transmit positional information of the mobile type apparatus to the first information processing apparatus.

Accordingly, a position of each mobile type apparatus can be recognized through the information processing apparatus.

In the imaging system according to the aspect of the present disclosure, each mobile type apparatus may further perform, in a case where assignment of the role of the imaging target is recognized, a control for directing a front surface of the mobile type apparatus toward the mobile type apparatus to which the role of the imaging responsibility is assigned, using the received positional information.

Accordingly, the image can be captured in a state where the mobile type apparatus of the imaging target is directed in an appropriate direction.

In the imaging system according to the aspect of the present disclosure, in a case where the preset imaging target and the mobile type apparatus to which the role of the imaging target is assigned are present in the acquired image and a predetermined gesture is performed by the preset imaging target, the control for storing the image in the storage unit may be performed.

Accordingly, the captured image can be formed at an appropriate timing.

In the imaging system according to the aspect of the present disclosure, in a case where the preset imaging target and the mobile type apparatus to which the role of the imaging target is assigned are present in the acquired image and a predetermined sound is input, the control for storing the image in the storage unit may be performed.

Accordingly, the captured image can be formed at an appropriate timing.

The imaging system according to the aspect of the present disclosure may further include: a second information processing apparatus including: a third memory; and a third processor being connected to the third memory and being configured to receive an image transmitted from the mobile type apparatus to which the role of the imaging responsibility is assigned, wherein the first processor is configured to transmit the image to the information processing apparatus in a case where the preset imaging target and the mobile type apparatus to which the role of the imaging target is assigned are present in the acquired image.

Accordingly, the image can be stored in the information processing apparatus.

In the imaging system according to the aspect of the present disclosure, the information processing apparatus may transmit the received image to the mobile type apparatus to which the role of the imaging responsibility is assigned, and the mobile type apparatus to which the role of the imaging responsibility is assigned may receive the image transmitted from the information processing apparatus.

Accordingly, the image can be stored through the information processing apparatus.

In the imaging system according to the aspect of the present disclosure, the information processing apparatus may perform image processing of processing the received image.

Accordingly, the image can be processed by the information processing apparatus.

In the imaging system according to the aspect of the present disclosure, the information processing apparatus may generate data for creating a photo album using the received image.

Accordingly, the photo album can be created.

In the imaging system according to the aspect of the present disclosure, the information processing apparatus may select an image satisfying a predetermined selection condition from received images, and may generate the data using the selected image.

Accordingly, the photo album can be created using an appropriate image.

According to the present disclosure, an effort required for the imaging target to image a photograph together with the mobile type apparatus can be reduced.

What is claimed is:

1. An imaging system comprising:
   a plurality of mobile type apparatuses each including:
      a first memory; and
      a first processor being connected to the first memory and being configured to:
         recognize whether a role of an imaging target is assigned or a role of imaging responsibility is assigned to a host apparatus,
         in a case where assignment of the role of the imaging responsibility is recognized, acquire an image obtained by imaging performed by an imaging apparatus,
         in a case where at least one of a preset imaging target or a mobile type apparatus to which the role of the imaging target is assigned is not present in the acquired image, perform a control for arranging, within an angle of view of the imaging apparatus, the preset imaging target and the mobile type apparatus to which the role of the imaging target is assigned,
      in a case where the preset imaging target and the mobile type apparatus to which the role of the imaging target is assigned are present in the acquired image, perform a control for storing the acquired image in a storage unit,
      in a case where the preset imaging target and the mobile type apparatus to which the role of the imaging target is assigned are present in the acquired image, perform a control for forming the image on a recording medium,
      discharge the recording medium on which the image is formed, to a preset delivery target in a deliverable state, and
      control movement of the mobile type apparatus for delivering the recording medium to the delivery target, wherein the plurality of mobile type apparatuses include at least one mobile type apparatus to which the role of the imaging target is assigned, and at least one mobile type apparatus to which the role of the imaging responsibility is assigned.

2. The imaging system according to claim 1, wherein at least a partial period of a period from a start of forming of the image on the recording medium until completion of discharge of the recording medium, and a period from a start of movement until completion of the movement is overlapped.

3. The imaging system according to claim 2, wherein the first processor is configured to start controlling the movement and start forming the image at the same timing.

4. The imaging system according to claim 1, wherein the first processor is configured to:
derive, from a distance to the delivery target and a time period required from a start of forming of the image until completion of discharge performed, a movement speed at which the recording medium becomes the deliverable state at a position at which the recording medium is deliverable to the delivery target, and
control the movement in accordance with the derived movement speed.

5. The imaging system according to claim 1, wherein the recording medium is a photosensitive recording medium.

6. The imaging system according to claim 1, wherein the first processor is configured to, in a case where the preset imaging target and the mobile type apparatus to which the role of the imaging target is assigned are present in the acquired image, perform a control for forming at least one of a plurality of images consecutively captured by the imaging apparatus on the recording medium.

7. The imaging system according to claim 1, wherein the preset imaging target is the same as the delivery target.

8. The imaging system according to claim 1, wherein the first processor is configured to control the movement in a case where the delivery target is present within a range predetermined as a deliverable range.

9. The imaging system according to claim 1, wherein the first processor is configured to perform image processing of processing the acquired image.

10. The imaging system according to claim 1, wherein the first processor is configured to recognize, in accordance with a gesture predetermined depending on the role, whether the role of the imaging target is assigned or the role of the imaging responsibility is assigned to the host apparatus.

11. The imaging system according to claim 1, wherein the first processor is configured to recognize, in accordance with a sound predetermined depending on the role, whether the role of the imaging target is assigned or the role of the imaging responsibility is assigned to the host apparatus.

12. The imaging system according to claim 1, wherein the first processor is configured to receive, in a case where assignment of the role of the imaging responsibility is recognized, positional information of the mobile type apparatus to which the role of the imaging target is assigned, and receive, in a case where assignment of the role of the imaging target is recognized, positional information of the mobile type apparatus to which the role of the imaging responsibility is assigned.

13. The imaging system according to claim 12, further comprising:
a first information processing apparatus including:
a second memory; and
a second processor being connected to the second memory and being configured to:
receive positional information transmitted from the mobile type apparatus to which the role of the imaging target is assigned, and positional information transmitted from the mobile type apparatus to which the role of the imaging responsibility is assigned, and
transmit, to the mobile type apparatus to which the role of the imaging responsibility is assigned, the received positional information of the mobile type apparatus to which the role of the imaging target is assigned, and
transmit, to the mobile type apparatus to which the role of the imaging target is assigned, the received positional information of the mobile type apparatus to which the role of the imaging responsibility is assigned,
wherein the first processor is configured to transmit positional information of the mobile type apparatus to the first information processing apparatus.

14. The imaging system according to claim 12, wherein the first processor is configured to, in a case where assignment of the role of the imaging target is recognized, perform a control for directing a front surface of the mobile type apparatus toward the mobile type apparatus to which the role of the imaging responsibility is assigned, using the received positional information.

15. The imaging system according to claim 1, wherein the first processor is configured to, in a case where the preset imaging target and the mobile type apparatus to which the role of the imaging target is assigned are present in the acquired image and a predetermined gesture is performed by the preset imaging target, perform the control for storing the image in the storage unit.

16. The imaging system according to claim 1, wherein the first processor is configured to, in a case where the preset imaging target and the mobile type apparatus to which the role of the imaging target is assigned are present in the acquired image and a predetermined sound is input, perform the control for storing the image in the storage unit.

17. The imaging system according to claim 1, further comprising:
a second information processing apparatus including:
a third memory; and
a third processor being connected to the third memory and being configured to receive an image transmitted from the mobile type apparatus to which the role of the imaging responsibility is assigned,
wherein the first processor is configured to transmit the image to the information processing apparatus in a case where the preset imaging target and the mobile type apparatus to which the role of the imaging target is assigned are present in the acquired image.

18. The imaging system according to claim 17,
wherein the third processor is configured to transmit the received image to the mobile type apparatus to which the role of the imaging responsibility is assigned, and
the first processor of the mobile type apparatus to which the role of the imaging responsibility is assigned is configured to receive the image transmitted from the information processing apparatus.

19. The imaging system according to claim 17,
wherein the third processor is configured to perform image processing of processing the received image.

20. The imaging system according to claim 17,
wherein the third processor is configured to generate data for creating a photo album using the received image.

21. The imaging system according to claim 20,
wherein the third processor is configured to:
select an image satisfying a predetermined selection condition from received images, and
generate the data using the selected image.

* * * * *